UNITED STATES PATENT OFFICE.

EMILE AUGUSTE FOURNEAUX, OF MANCHESTER, ENGLAND, ASSIGNOR TO CALICO PRINTERS' ASSOCIATION LIMITED, OF MANCHESTER, ENGLAND.

PRINTING VISCOSE ON TEXTILE FABRICS.

1,087,938. Specification of Letters Patent. Patented Feb. 24, 1914.

No Drawing. Application filed March 7, 1913. Serial No. 752,740.

*To all whom it may concern:*

Be it known that I, EMILE AUGUSTE FOURNEAUX, Ph.D., a citizen of the United States, residing at St. James's Buildings, Oxford street, Manchester, in the county of Lancaster, England, have invented new and useful Improvements in Printing Viscose on Textile Fabrics, of which the following is a specification.

In printing viscose on textile fabrics it has heretofore proved difficult to produce regularly and uniformly a film capable of resisting mechanical strain. Rubbing strains especially tend to break that portion of the film which lies on the surface of the fiber, and as it is precisely on that portion of the film that the print mainly depends for its effect it follows that the desired effect is to a considerable extent lost. If the viscose be used as a carrying and fixing medium for insoluble mineral matter this defect becomes even more perceptible, especially if the mineral matter employed has little or no mechanical affinity for the fiber. In order to resist such strains the film must be strong, elastic and flexible and it must adhere well both to the fiber and to the mineral matter, if any. It must moreover be capable of resisting the action of the chemical and mechanical agents to which the fabric may subsequently be subjected in the ordinary course of manufacture. Films consisting essentially of sound cellulose answer these requirements reasonably well provided the amount of viscose deposited on the fabric be sufficient to form a substantial film and provided the degree of penetration of the viscose into the fabric be correctly regulated. If the film is to be produced by printing it must in addition to the above requirements give a perfect and sharp impression or mark. The production of such an impression involves the use of a printing color of suitable consistency, applied by a printing roller not too deeply engraved, so that the amount of the viscose solution deposited on the fiber can only be comparatively small. It follows therefore that the use of relatively concentrated viscose solutions is necessary if a substantial film is to be obtained.

Correctly prepared viscose solutions of normal composition and suitable thickness are excellent printing colors as long as they are fresh, but they are barely concentrated enough to produce a substantial film with any but the heaviest patterns and they soon deteriorate by becoming thicker and less fluid, in technical parlance "short", as polymerization takes places and leads to less soluble viscoses. In order to retard polymerization and improve the printing qualities of concentrated solutions it has been found advantageous to use viscose solutions containing a material excess of alkali, preferably caustic alkali. After printing the fabric with viscose it must be submitted to certain treatments for the purpose of fixing the viscose, that is of regenerating cellulose. This can be accomplished by a variety of means, such as treatment with concentrated solutions of suitable acids or salts, exposure to dry heat or to steam, or even by leaving or exposing the goods until fixation takes place spontaneously. With one exception all these methods involve exposure of the cellulose compounds to the simultaneous action of air and alkali. The destructive action of alkalis on cellulose in the presence of air is well known and it is therefore not surprising to find that the film ultimately obtained sometimes contains considerable proportions of bodies other than sound cellulose and consequently falls short of the technical requirements. The only alternative method of fixing viscose, (viz., treatment with concentrated solutions of suitable acids or preferably salts) is unfortunately not as satisfactory for the present purpose as it is for some other purposes, for instance the manufacture of artificial silk. Viscose prints fixed by this wet method are apt to lose much of their effect and smartness by the slight running due to the action of the water before fixation takes place; the fabric is soiled by the sulfur and sulfur compounds precipitated thereon, and a lengthy and rather trying treatment is necessary for the purpose of removing these impurities as well as the excess of precipitating agent.

The underlying principle of my invention consists in preventing the detrimental action of the alkali during the dry fixing processes by neutralizing a considerable part of the alkali soon after printing and before any material destruction of the cellulose can take place. For this purpose I impregnate the fabric before printing with a solution of a suitable material capable of neutralizing the required proportion of the alkali of the viscose solution, and dry. I then print the prepared fabric, which should preferably be calendered for the purpose of obtaining a smooth and hard face, with a suitable viscose solution, preferably containing an excess of alkali for the reasons stated above. After printing, I fix the viscose by exposure to dry heat, steaming, or spontaneous decomposition, but preferably by a combination of these several means.

Materials capable of neutralizing a portion of the alkali of the viscose are obviously acids and their equivalents, such as acid salts, esters, and the salts of weak or volatile bases. In order to be suitable for my process such substances must not have any detrimental effect on either the fabric or the viscose under the working conditions. It is also desirable that they should have a gentle and gradual action so as not to interfere with the necessary degree of penetration of the viscose into the fabric and that they should be readily removed from the fabric by the subsequent washing. Substances such as fats, which though capable of neutralizing alkali act so slowly under my working conditions that neutralization does not take place soon after printing and before any material destruction of the cellulose can take place, are not suitable for my purpose.

Several of the materials which I use are essentially the same as used in the known wet fixing process, but the two processes differ essentially in the mode of application and in the purpose to which they are applied. In the known process the fabric is passed through relatively concentrated solutions of the said materials after printing, whereas in my process the fabric is impregnated with relatively diluted solutions of the said materials and dried before printing. In the known process the said materials are used for the purpose of bringing about complete fixation, while in my process they are applied for the purpose of neutralizing the excess of alkali and only contribute to the fixation of the viscose to the extent that less alkaline viscoses fix more readily, but I depend for complete fixation on exposure to dry heat, steaming, or spontaneous decomposition. In the known process the said materials must be applied in excess for the purpose of decomposing the viscose rapidly and completely. In my process it is on the contrary essential to avoid complete decomposition of the viscose which would lead to less satisfactory fixation and to the occurrence of most of the objectionable features of the wet process described above, and for this reason the proportion of the said materials incorporated into the fabric must be carefully regulated. It is also desirable to select materials having a gentle and gradual action so as not to interfere with the necessary degree of penetration of the viscose into the fabric. Apart from the materials above specified the solutions which I use for the purpose of impregnating the fiber may advantageously contain other substances such as glycerin, hygroscopic salts, suitable thickening agents, etc. The viscose solutions used for printing purposes may contain suitable additions such as insoluble mineral matter, pigments, coloring matters, preferably of the vat dye class, etc. The addition of glycerin to the printing colors is not desirable but may at times be necessary for the purpose of fixing coloring matters.

I append one example by way of illustration but I wish it to be clearly understood that I do not confine myself to the particular materials or substances specified or to the proportions stated as the same may be varied or modified according to requirements.

Example: The fabric is slop padded with a solution containing four per cent. ammonium sulfate and dried. It is then calendered. The fabric so prepared is subsequently printed with a suitable viscose solution, e. g. a solution containing ten per cent. cellulose in the form of viscose and five and a half to seven per cent. total alkali calculated as caustic soda (NaOH), to which may be added eight to ten per cent. of suitable mineral matter, such as china clay, etc. The printed fabric is then dried and subsequently pased through the short continuous steamer technically known as "ager" for say three minutes at about two hundred and ten degrees Fahrenheit for the purpose of fixing the viscose. The fabric may then be washed at once or if necessary the fixation may be completed by allowing it to lie for a day or two before washing.

While the underlying principle of my invention may be fairly obvious its application is to the best of my knowledge novel and undoubtedly useful and it could not be foreseen a priori that the desired technical effect—reliable production and fixation of a strong elastic and tenacious film capable of withstanding mechanical strains—would be brought about by these means, especially as it was not improbable that the effect of the contact between the viscose and the neutralizing material would be to prevent fixation of the cellulose film on the fabric.

I declare that what I claim and desire to secure by Letters Patent in the United States is:—

1. The herein described method of printing viscose on textile fabrics which consists in impregnating the fabric before printing with a solution capable of neutralizing a considerable part of the alkali soon after printing and before any material destruction of the cellulose can take place, drying the impregnated fabric, printing with a viscose solution preferably containing an excess of alkali and finally fixing the viscose by any of the usual methods, substantially as described.

2. The herein described method of printing viscose on textile fabrics which consists in impregnating the fabric before printing with a solution capable of neutralizing a considerable part of the alkali soon after printing and before any material destruction of the cellulose can take place, drying the impregnated fabric, printing a viscose solution preferably containing an excess of alkali and finally fixing the viscose by steaming, substantially as described.

3. The herein described method of printing viscose on textile fabrics which consists in impregnating the fabric before printing with a solution of a salt of a volatile base capable of neutralizing a considerable part of the alkali soon after printing and before any material destruction of the cellulose can take place, drying the impregnated fabric, printing with a viscose solution preferably containing an excess of alkali and finally fixing the viscose by steaming, substantially as described.

4. The herein described method of printing viscose on textile fabrics which consists in impregnating the fabric before printing with a solution of a salt of a weak base capable of neutralizing a considerable part of the alkali soon after printing and before any material destruction of the cellulose can take place, drying the impregnated fabric, printing with a viscose solution preferably containing an excess of alkali and finally fixing the viscose by steaming, substantially as described.

5. The herein described method of printing viscose on textile fabrics which consists in impregnating the fabric before printing with a solution containing ammonium sulfate of such concentration as to be capable of neutralizing a considerable part of the alkali contained in the viscose solution, drying the impregnated fabric, printing with a viscose solution containing an excess of alkali and finally fixing the viscose by steaming, substantially as described.

In testimony whereof I have signed my name to this specification in the presence of two subscribing witnesses.

EMILE AUGUSTE FOURNEAUX.

Witnesses:
 SAMUEL WALKEY GILLETT,
 HERBERT ROWLAND ABBEY.